June 18, 1940.  E. WOHLENHAUS  2,205,329

PLANETARY AIR-LIQUID CLUTCH

Filed Dec. 8, 1939  2 Sheets-Sheet 1

Inventor
Emil Wohlenhaus
By Shepherd & Campbell
Attorneys

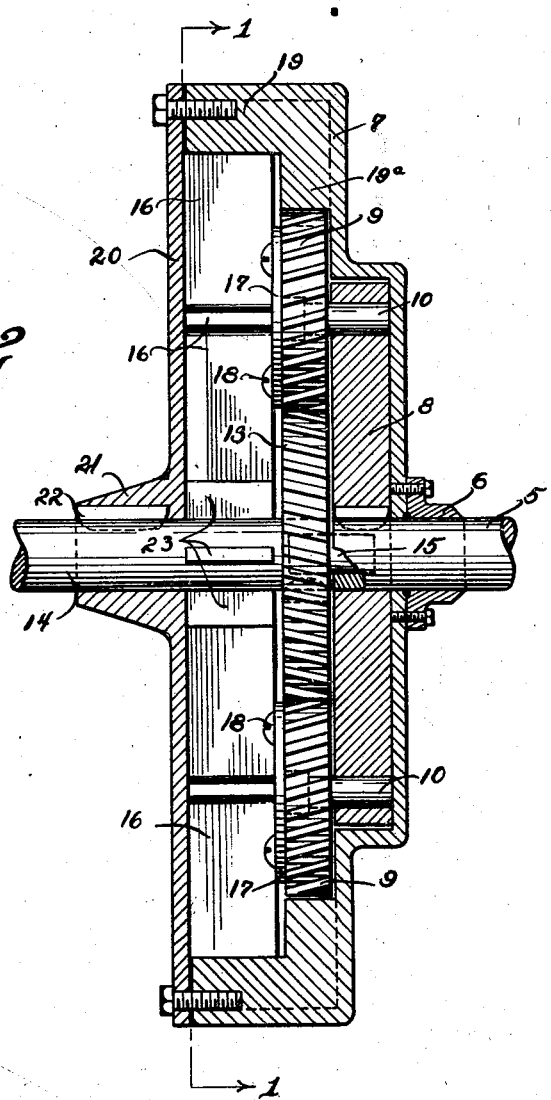

Patented June 18, 1940

2,205,329

UNITED STATES PATENT OFFICE 2,205,329

PLANETARY AIR-LIQUID CLUTCH

Emil Wohlenhaus, Truman, Minn.

Application December 8, 1939, Serial No. 308,225

5 Claims. (Cl. 74—294)

This invention relates to fluid clutches, and it has for its object to provide an improved clutch of this nature, in which the transmission of power from a driving to a driven shaft may be more accurately determined and controlled than is ordinarily possible with clutches of this type. Further objects and advantages of the invention will be set forth in the detailed description which follows.

In the accompanying drawings:

Fig. 2 is a central vertical sectional view.

Like numerals designate corresponding parts throughout the several figures of the drawings.

Figure 1:
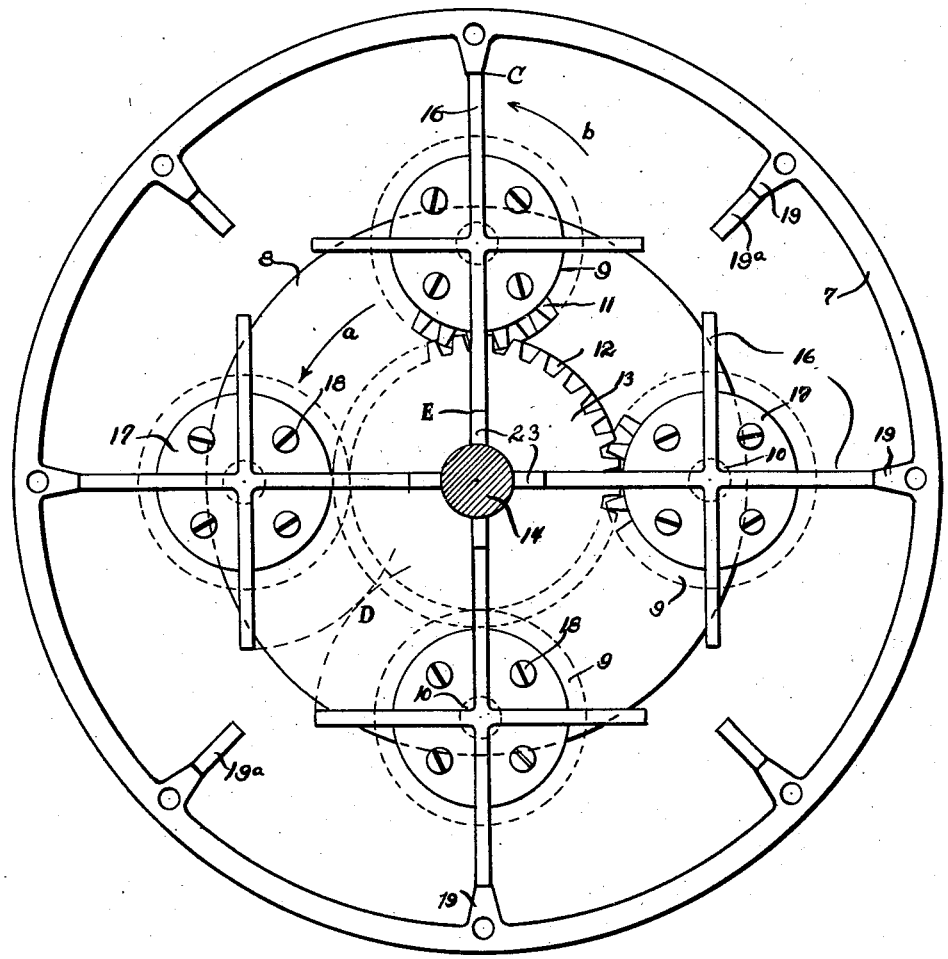
Figure 1 is a vertical sectional view upon line 1—1 of Fig. 2.

In the particular form of the invention which I have chosen for purposes of illustration, a driving or input shaft 5 passes through a suitable fluid-tight bearing 6 to the interior of the clutch casing, the body of which is indicated at 7. Within this casing, the inner end of the shaft 5 is keyed or otherwise secured to a drive pinion disk 8.

A plurality of pinions 9, in this case four, are mounted to turn upon fixed stub shafts 10, said shafts being carried by disk 8. The teeth 11 of the pinions mesh with the teeth 12 of output gear 13. Gear 13 is keyed or otherwise secured upon the output or driven shaft 14. An aligning pin 15 aids in mounting the confronting ends of the shafts 5 and 14 for rotation and in holding them in proper alignment with each other.

Each of the pinions 9 carries a plurality of resistance blades 16. These blades are fast upon flanges 17, and these flanges in turn are secured by the cap screws 18 to the outer faces of the pinions. The outer portions of the blades coact with retarding lugs 19, said lugs being carried by the casing 7, and it being noted that these lugs comprise portions 19ᵃ which lie behind the blades, as well as the portions 19, which lie beyond the line of travel of the ends of the blades.

A cover plate 20 is secured to and forms a part of the casing 7. The cover plate is provided with a suitable hub 21, and this hub is preferably keyed at 22 to shaft 14. The shaft 14 carries a plurality of retarding lugs 23, which correspond in number to the pinions 9.

It is clear that if the pinions were locked to their stub shafts so that they could not turn thereon, the shafts 5 and 14 would, in effect, be locked together, because then the drive would be through the elements 5, 8, 9 and 13 to shaft 14.

It is equally as clear that if the pinions 9 were always wholly free to turn upon the stub shafts 10, then rotation of shaft 5 would, with a resisting load upon shaft 14, do no more than merely cause the pinions 9 to spin around upon their stub shafts 10 as they traveled in planetary fashion around the then stationary gear 13.

Thus, the degree of movement imparted by shaft 5 to shaft 14 is determined by and proportional to the resistance to rotation upon their axes imposed upon pinions 9. This resistance is determined by the action upon the blades 16 of any suitable fluid, such as oil, for example, to be placed in the casing 7. While I may entirely fill the casing with liquid, I prefer to have it partly filled with air and thus constitute this clutch what may be termed "a planetary air-liquid clutch," as will be hereinafter set forth.

Referring now to Figs. 1 and 2, and assuming the casing to be partially filled with a liquid such as oil, and assuming the rotation of shaft 5 with disk 8 to be in the direction of arrow a, as viewed in Fig. 1, any relative movement between pinions 9 and gear 13 will bring about counterclockwise rotation of the pinions upon their stub shafts 10, as indicated by the arrow b in Fig. 1.

The rotation of the blades 16 is resisted at three points, to wit: at C, where the outer portions of the blades have to pass through the restricted area caused by the presence of the lugs 19—19ᵃ; at D, where the ends of the blades of one pinion have to pass the ends of the blades of another pinion moving in the opposite direction, and at E, where the ends of the blades 16 pass the retarding lugs 23 of shaft 14.

As the outer ends of the blades move toward the lugs 19, some of the liquid becomes more or less trapped between the blades and the lugs, and the resistance imposed upon the blades in their effort to displace this liquid sufficiently for them to pass the lugs is created not merely by the body of liquid as such, but by the fact that the liquid tends to maintain its place under the action of centrifugal force. Thus the lugs 19—19ᵃ not only serve their purposes as abutments for coaction with the blades as described, but they serve as impellers to cause the liquid to partake of the rotary motion of the casing and thus bring the element of centrifugal force upon the oil into action as described.

I do not wish to limit the invention to a particular ratio between the gear and the pinions. Where a ratio of two to one is employed, each blade 16 will make two complete revolutions for each revolution of its pinion around gear 13. Since there are four blade ends to each pinion and since there are three points of clearance for each blade end, to wit: C, D and E, it follows that there will be ninety-six points of retardation for each revolution of the input shaft. This gives an even, steady flow of power from input to output shaft, without shock or jar, and insures that uneven loads upon the driven shaft will not cause more slippage than is intended, or in other words, than is provided for by blade area, volume of liquid in the casing, etc.

The action of the blades, when the casing is only partly filled with liquid, causes a miniature tornado at the center of the casing. The relatively long blades 16 yield such leverage in their action of retarding the pinions that this clutch may be given a very positive working speed, so that it will not slip beyond the intended degree under variations of load on the output shaft.

While the action that I have described yields highly desirable results, I wish it to be recognized that there is here disclosed a novel type of clutch comprising retarding blades upon pinions of planetary type, to wit: pinions which travel bodily through a circular orbit and also rotate upon their own axes, the retardation of said pinions by the blades determining the degree of slippage between an input and an output shaft.

The invention is not limited to the precise constructions set forth, but it includes within its purview whatever changes fairly come within either the terms or the spirit of the appended claims.

Having described my invention, what I claim is:

1. A clutch of the character described comprising a driving shaft and a driven shaft, said shafts being disposed in substantial alignment end to end, a casing supported upon said shafts in place to have said casing enclose the inner ends of said shafts, a pinion disc mounted upon the driving shaft within the casing, a plurality of pinions mounted upon said disc for bodily movement with the disc and for rotation about their axes, a gear upon the driven shaft with which said pinions mesh, and a plurality of retarding blades carried by each of said pinions, said casing having such mounting with respect to the shafts as to adapt it to retain a liquid, and a plurality of retarding lugs, projecting inwardly from the periphery of the casing, with which the outer ends of the retarding blades coact, said lugs comprising portions lying in alignment with the outer ends of the blades and portions which project inwardly partway along the sides of the blades.

2. A clutch of the character described comprising a driving shaft and a driven shaft, said shafts being disposed in substantial alignment end to end, a casing supported upon said shafts in place to have said casing enclose the inner ends of said shafts, a pinion disc mounted upon the driving shaft within the casing, a plurality of pinions mounted upon said disc for bodily movement with the disc and for rotation about their axes, a gear upon the driven shaft with which said pinions mesh, and a plurality of retarding blades carried by each of said pinions, said casing having such mounting with respect to the shafts as to adapt it to retain a liquid, and radial lugs carried by the driven shaft, with which the inner ends of the blades coact.

3. A clutch of the character described comprising a driving shaft and a driven shaft, said shafts being disposed in substantial alignment end to end, a casing supported upon said shafts in place to have said casing enclose the inner ends of said shafts, a pinion disc mounted upon the driving shaft within the casing, a plurality of pinions mounted upon said disc for bodily movement with the disc and for rotation about their axes, a gear upon the driven shaft with which said pinions mesh, a plurality of retarding blades carried by each of said pinions, said casing having such mounting with respect to the shafts as to adapt it to retain a liquid, and a plurality of lugs projecting inwardly from the periphery of the casing, with which the outer ends of the blades coact, and retarding lugs carried by the driven shaft, with which the inner ends of the blades coact.

4. A clutch of the character described comprising a driving shaft and a driven shaft, said shafts being disposed in substantial alignment end to end, a casing supported upon said shafts in place to have said casing enclose the inner ends of said shafts, a pinion disc mounted upon the driving shaft within the casing, a plurality of pinions mounted upon said disk for bodily movement with the disc and for rotation about their axes, a gear upon the driven shaft with which said pinions mesh, a plurality of retarding blades carried by each of said pinions, said casing having such mounting with respect to the shafts as to adapt it to retain a liquid, means for connecting said casing to one of said shafts for bodily rotation therewith, a plurality of lugs projecting inwardly from the periphery of said casing, with which the outer ends of the blades coact, and a plurality of lugs projecting radially from the driven shaft with which the inner ends of the blades coact.

5. A clutch of the character described comprising a driving shaft and a driven shaft, said shafts being disposed in substantial alignment end to end, a casing supported upon said shafts in place to have said casing enclose the inner ends of said shafts, a pinion disc mounted upon the driving shaft within the casing, a plurality of pinions mounted upon said disc for bodily movement with the disc and for rotation about their axes, a gear upon the driven shaft with which said pinions mesh, a plurality of retarding blades carried by each of said pinions, said casing having such mounting with respect to the shafts as to adapt it to retain a liquid, means for connecting said casing to one of said shafts for bodily rotation therewith, a plurality of lugs projecting inwardly from the periphery of said casing, with which the outer ends of the blades coact, and a plurality of lugs projecting radially from the driven shaft, with which the inner ends of the blades coact, said blades being of such length and the said pinions being of such number that the blades of adjacent pinions travel in sufficiently close proximity to each other as to have a retarding action imposed thereon by the presence of liquid trapped between them.

EMIL WOHLENHAUS.